Sept. 4, 1928.
R. L. HANAU
1,682,904
DENTAL MANIKIN
Filed Aug. 12, 1926 2 Sheets-Sheet 1
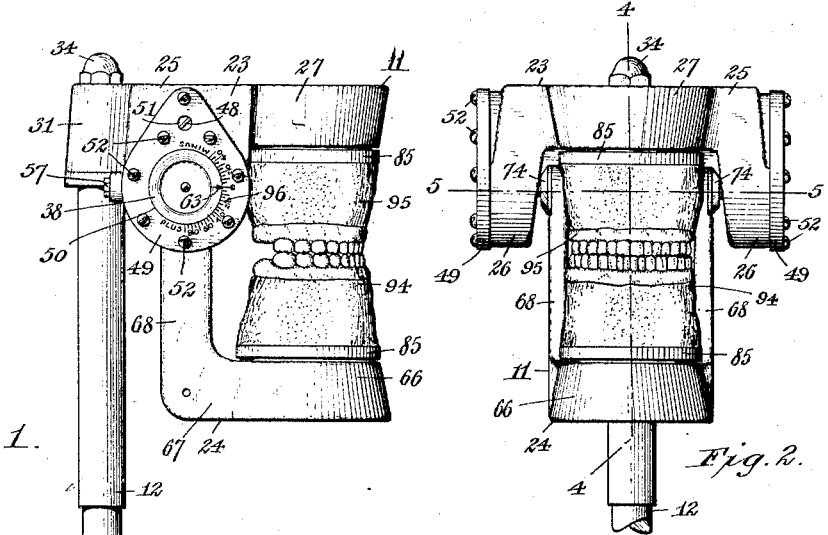
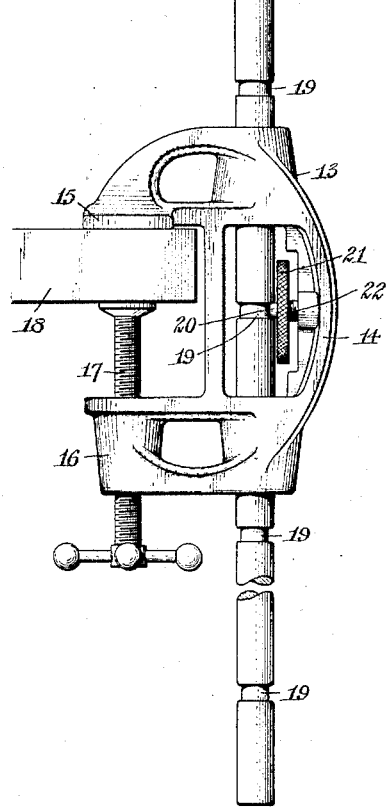
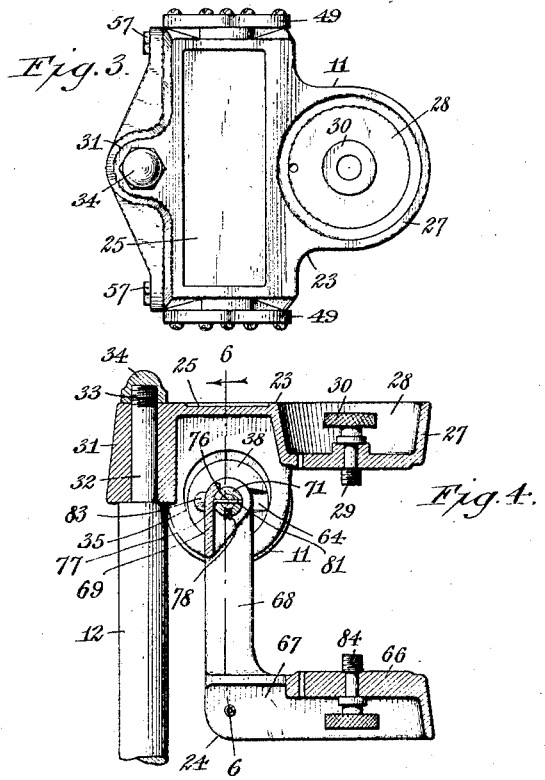
Rudolph L. Hanau, Inventor.

Sept. 4, 1928.  
R. L. HANAU  
DENTAL MANIKIN  
Filed Aug. 12, 1926  
2 Sheets-Sheet 2
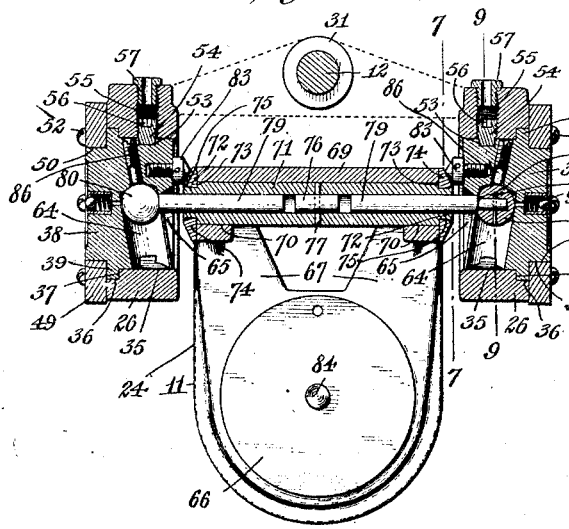
Fig. 5.
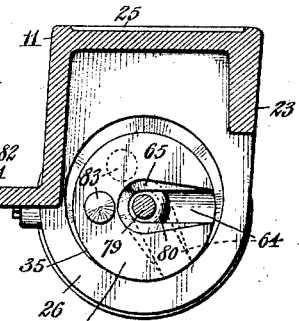
Fig. 7.
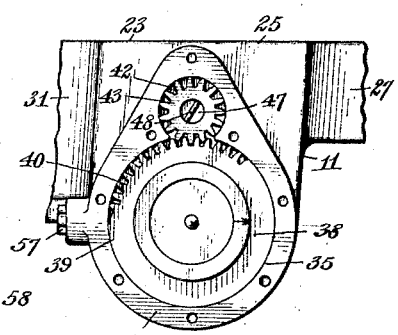
Fig. 8.
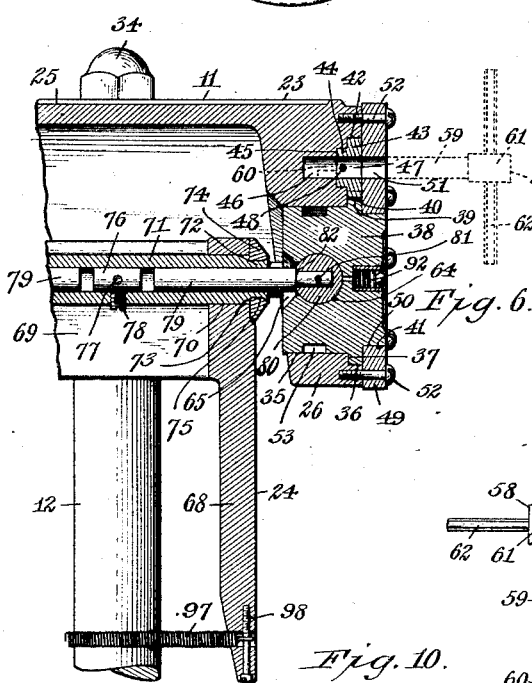
Fig. 6.
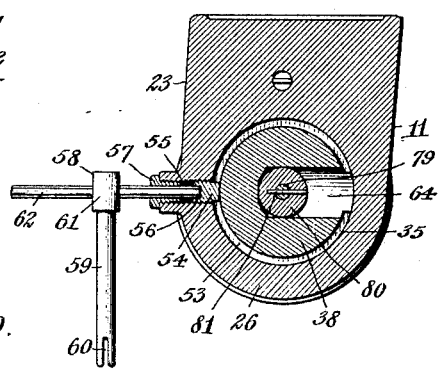
Fig. 9.
Fig. 10.
Rudolph L. Hanau, Inventor.
By Emil Kunhart
Attorney.
Witness:
J. J. Oberst.

Patented Sept. 4, 1928.

1,682,904

UNITED STATES PATENT OFFICE.

RUDOLPH L. HANAU, OF BUFFALO, NEW YORK.

DENTAL MANIKIN.

Application filed August 12, 1926. Serial No. 128,772

My invention relates to a dental manikin, an instrument for teaching and clinical demonstrations of actual and hypothetical cases, it being adapted to replace articulators now used in colleges and other dental institutions of learning when demonstrating mandibular movements and to replace the patient when making mandibular movements.

The primary object of my invention is the production of an instrument of this kind by the use of which pure geometric and cinematical peculiarities of the jaw function governed by the condylar joints can be represented, due to the adjustability of the instrument.

A further object of my invention is the production of an instrument of this kind by means of which measurements and records of condylar conditions can be made in a manner similar to that required in observing or securing such conditions directly from a patient.

A further object of my invention is to provide an instrument of this kind by means of which impression work, measurements, and demonstrations of the resilient and like effect of the tissues are made possible, by inserting suitable ridges, representing the gums of a patient, on the mounting supports attachable to the upper and lower jaw members of the instrument.

A still further object is to provide an instrument of the kind described, which possesses novel features of construction and peculiarities in action which are adaptable for use in dental articulators, and whereby the results above referred to are attained in a simple, substantial and practicable manner, and furthermore, by the use of which students acquire sufficient skill for practical general dental work.

The invention consists in the novel features of construction and in the arrangement and combination of parts to be hereinafter described and more particularly pointed out in the subjoined claims.

In the drawings:—

Fig. 1 is a side elevation of the instrument used in connection with a combined standard and table clamp.

Fig. 2 is a front elevation of the instrument and a portion of the upper end of the standard.

Fig. 3 is a plan view.

Fig. 4 is a transverse vertical section taken on line 4—4, Fig. 2, the mounting supports being omitted.

Fig. 5 is an enlarged horizontal section taken on line 5—5, Fig. 2.

Fig. 6 is an enlarged vertical section taken on line 6—6, Fig. 4, looking in the direction of the arrow crossing said line.

Fig. 7 is an enlarged vertical longitudinal section taken on line 7—7, Fig. 5.

Fig. 8 is a partial side elevation showing the cover plate removed.

Fig. 9 is a transverse section taken on line 9—9, Fig. 5.

Fig. 10 is a view similar to Fig. 8, showing a modified form of operating the rotatably adjustable disk mounts.

The manikin proper is designated by the numeral 11, and it is mounted upon a standard 12 which may, if desired, have a suitable base at its lower end to support the same; but in the manner shown is vertically adjustable within a table or bench clamp 13. This table or bench clamp comprises an openwork frame or body portion 14 having a table or bench jaw 15, and a screw support 16 alined with said jaw 15 through which a clamping screw 17 is passed, the jaw 15 being adapted to rest upon the table or bench designated, for example, by the numeral 18, while the clamping screw 17 is forced firmly in contact with the underside of said table or bench.

The standard 12 is provided with a series of circumferential grooves 19 spaced apart along the length thereof, in any of which a lock stud 20 is adapted to be entered, said stud projecting axially from one face of a peripherally knurled disk 21, from the other face of which axially extends a screw 22 threaded into the openwork frame 14, the stud 20, disk 21 and screw 22 forming a lock device for the standard 12.

The manikin has an upper jaw member 23 rigidly mounted upon the upper end of the standard 12, and a lower jaw member 24 suspended from the upper jaw member in a manner to be particularly described hereinafter.

The upper jaw member comprises an oblong longitudinally-disposed body portion 25 from opposite ends of which pivot supports 26 extend and forwardly from which a particircular jaw 27 extends, said jaw representing the upper jaw of a patient and having a circular depression 28 formed in the upper side thereof partly extending into the oblong body portion 25. Axially arranged for rotation in said jaw is a screw stud 29 to the upper end of which is secured a knob 30 completely confined within the depression 28 of said jaw, and by means of which the securing screw 29 is conveniently rotated.

Extending centrally from the rear of said oblong body portion 25 is a boss 31 into or through which the upper end of the standard 12 is passed. In the particular instance shown, the standard 12 has its upper end reduced, as at 32, and its terminal threaded, as at 33, the reduced portion being passed through the boss 31 and having a securing nut 34 applied to its threaded portion and bearing against the upper side of said boss, while the shoulder formed on the rod by reducing the upper end thereof has the lower end of said boss bearing thereagainst. In this manner the upper jaw member is firmly secured to the standard.

The pivot supports 26 have longitudinally alined circular openings 35 formed therethrough, the outer ends of which are enlarged, as at 36, to provide outwardly facing shoulders 37 in said openings. Arranged within said alined openings are pivot mounts for the lower jaw member 24, preferably in the form of rotatably adjustable disks or disk mounts 38. Each disk mount is provided with a circumferential flange 39 along part of which gear teeth 40 are cut or otherwise formed, said gear teeth forming a segmental gear integral with the disk mount, and each of these disk mounts is reduced in diameter at its outer end, as at 41.

The circumferential flanges 39, or gear flanges as they may be termed, fit into the enlarged portions of the alined openings 35, while the reduced outer ends thereof extend outwardly beyond the outer faces of the pivot supports 26 in which said openings are formed.

Formed in the ends of the oblong body portion 25 are substantially circular depressions 42, in which pinions or gear wheels 43 are rotatably arranged, said gear wheels having bosses 44 on their inner sides fitted into co-axial sockets 45 in said depressions 42, and extending inwardly from said sockets are co-axial bores 46. These gear wheels 43 are provided with axially-disposed bores 47, the axes of which are coincident with the bores 46 formed in the body portion 25. A pin 48 is passed diametrically through the boss 44 of each gear wheel 43, serving as a means for cooperation with a specially designed key, to be hereinafter more particularly described, for rotating said gear wheels.

49 represents cover plates, one being adapted to be secured to each end of the body portion 25 of the upper jaw member. Each cover plate has a large opening 50 formed therein into which the reduced outer end of the disk mount at the same end of the body portion is adapted to extend. Said openings 50 are therefore co-axial with the openings 35 in the depending pivot supports 26. These plates fit against the gear flanges 39 of the disk mounts and prevent outward movement of said mounts, while the inner movement of said mounts is prevented by reason of said gear flanges bearing against the shoulders 37 formed in the openings 35. Each of these cover plates is provided with a key hole 51, and these key holes in the cover plates are co-axial with the bores in the gear wheels 43 and the bores 46 formed in the body portion 25. At intervals around the marginal portion of these cover plates, securing screws 52 are passed therethrough and threaded into the body portion 25, thus firmly securing the cover plates in position and completely concealing the means provided for rotatively adjusting the disk mounts.

Each of the disk mounts 28 is provided with a circumferential groove 53 into which is adapted to be tightened a set or lock screw 54 threaded and concealed within a tapped opening 55 extending inwardly from the rear of the body portion 25, said set screw having a specially formed axial socket 56 in its outer end; in this particular instance the socket being illustrated as hexagonal.

Threaded into the outer end of each of the tapped openings 55 is a flanged sleeve 57, the flange of which bears against the rear side of the body portion 25, the opening through said sleeve being preferably cylindrical and slightly larger in diameter than the socketed set screw which it conceals.

For rotatably adjusting the disk mounts and for securing the same in any adjusted position, a special key 58 is employed, this key being shown in full lines in Fig. 9, and in dotted lines in Fig. 6. The key has a cylindrical shank 59 diametrically slotted at its inner end, as at 60 and provided with a head 61 at its outer end. Passed through this head is a hexagonally-shaped handle 62.

When it is desired to rotatably adjust the disk mounts, one or the other end of the hexagonally-shaped handle is inserted through flanged sleeves 57 and entered into the hexagonal sockets of the set or lock screws 54; these screws being loosened to permit the disk mounts to be rotated. For rotatively adjusting the disk mounts, the shank 59 of the key is passed through the key holes in the cover plates 49, through the bores of the gear wheels 43, and into the bores 46 formed in the body portion 25 so that the pins 48 extending diametrically across the bores of the gear wheels are inserted in the slot of the key. Upon rotating the key, the gear wheel 43 engaged thereby is rotated, and by reason of the gear wheel being in mesh with the gear flange formed on the co-acting disk mount, the latter will be rotated to the desired degree, one disk mount being manipulated in this manner after the other to the same or in varying degrees, as may be required.

In order to determine the exact degree of rotation, the outer end of each disk mount is provided with a graduation mark 63, and each of the cover plates is provided with a segmental series of graduation marks 96 extending from zero in two directions, the graduation marks at one side of zero indicating minus, and those at the other side plus, these graduation marks being provided for a purpose to appear hereinafter.

Each of the rotatable disk mounts 28 is provided with a radial slot or guideway 64 which has an angular divergence from its plane of rotational adjustability, the divergence in these disk mounts being from their peripheral edge inwardly a distance beyond the axes thereof. These slots are open to the inner sides of the disk mounts and are parti-cylindrical in cross section and by reason of the center of the slots being closer to the inner sides of the disk mounts at the peripheries of the latter than at the axes thereof, the inner sides of said disk mounts are beveled toward said slots, as at 65, the bevels being gradually widened or enlarged from the peripheries of said disk mounts inwardly toward the centers thereof.

The lower jaw member 24 comprises a jaw 66 which is provided with two rear extensions 67 at opposite sides of its center, and from these rearward extensions two arms 68 extend upwardly which are connected together at their upper ends by a cross member 69. The upper ends of these arms are provided with longitudinally-alined openings 70 in which a sleeve 71 is fitted, said sleeve lying in contact with said cross member 69 and having its ends reduced, as at 72, to form shoulders 73 which are flush with the outer sides of the arms 68. Positioning disks, or more particularly centering disks 74 are fitted onto the reduced ends of the sleeve 71, and for this puropse said disks are provided with axial openings 75 flared outwardly through portions of their length. With a view of retaining said centering disks on the reduced ends of the sleeve, said ends are flared or spread, in the fashion of a rivet, to correspond to the flaring portions of the openings in said disks. Any other arrangement for fastening the centering disks 74 onto the ends of the sleeves 71 may be employed; but the construction shown and described has been found highly practicable and cheap and as there appears, at no time, to be any requirement for disassembling the parts, the fact that the centering disks are permanently fastened to the ends of the sleeves 71 in the manner set forth, is in no sense objectionable.

Centrally arranged within the sleeve is a short stop or abutment 76 pinned to said sleeve, as at 77, and if desired provided with additional fastening means, such as a set screw 78 threaded through the sleeve 71 and bearing against said stop or abutment. Pivot elements or rods 79 are loosely entered into said sleeve 71 from opposite ends, and these rods have spherical terminals 80 formed on or secured to their outer ends. Preferably, these terminals are separate spherical elements fastened to the ends of said pivot rods by means of pins 81, the outer ends of said pivot rods being reduced in diameter to provide shoulders 82 against which said spherical elements bear. These spherical elements, or terminals, of the pivot rods are positioned within the grooves or guideways 64 formed in the disk mounts, and the pivot rods, of which said spherical elements or terminals form part, are slidable into and out of the sleeve 71. When the spherical terminals of said pivot rods are moved into a position axially within the disk mounts, they are drawn outwardly from the sleeves 71 to their fullest extent, and when these terminals move outwardly within the grooves or guideways 64 formed within said disk mounts, the pivot rods 79 are gradually forced inwardly into said sleeve, the limit of inward movement of said pivot rods being determined by the ends of the stop or abutment 76 fixed centrally within said sleeve.

It may here be stated that when the disk mounts are adjusted to zero, the guideways therein are disposed horizontally and directed forwardly from the axes of said disk mounts. When adjusted along the series of minus graduations, these guideways are directed forwardly and upwardly, the upward inclination being in accordance with the degree of minus adjustment. When said guideways are inclined forwardly and downwardly, the adjustment is made along the series of plus graduation marks and the degree of inclination also is in accordance with the degree of adjustment along said plus graduation marks. A minus range of adjustment of 45 degrees and a plus range of adjustment of 90 degrees will be sufficient to include the most extreme cases to be treated or experimented with, and with zero adjustment placing the guide slots in the disk mounts in a horizontal position, the extreme upward inclination would be 45 degrees while the extreme downward inclination would be approximately 89 degrees, since when adjusting the disk mounts to 90 degrees plus, the guide slots will be in substantially vertical position.

The positioning or centering disks 74 are beveled or made to recede outwardly toward their peripheral edges and they are adapted to co-act with centering stops or studs 83 projecting inwardly from the inner faces of the disk mounts 26 in line with the guideways in said mounts. These stops have their inner ends made conical, the taper of which conforms to the bevel of the centering disks 74 adapted for contact therewith.

In the lower jaw 24 a screw stud 84 is rotatably arranged, said screw stud being similar to the screw stud 29 in the upper jaw and being normally alined therewith. The screw studs 29 and 84 are adapted to have mounting supports or plates 85 threaded thereonto, on both of which suitable dentures are to be mounted by the use of plaster of Paris or other plastic material, as is common in dental practice.

As the upper jaw member is rigidly secured to the standard 12 and the lower jaw member is pivotally suspended from said upper jaw member, manipulation of the instrument or device necessitates the movement of the lower jaw member. When the spherical terminals of the pivot rods 79 are axially disposed within the disk mounts, regardless of the radial direction to which the guideways in said mounts are adjusted, the centering disks 74 will be in contact with the centering stops or studs 83, and in this position the jaws of the instrument will be in the position of occlusion, often referred to as centric position. At such times the pivot rods will be drawn outwardly to their fullest extent.

Protrusive position is attained by moving the lower jaw member forwardly, at which time the spherical terminals of the pivot rods 79 are moved outwardly in the guideways of the disk mounts, with the result that the centers of said spherical terminals are brought closer together, this being effected by reason of the inward deviation of said guideways from the plane of rotation of the disk mounts, and this forward movement causes the pivot rods 79 to be moved slightly inwardly into the sleeve 71 supporting them, the degree of protrusion being in accordance with the extent of movement of the spherical terminals of the pivot rods outwardly along their guideways. When moved outwardly to their full extent, the inner ends of the pivot rods 79 will be in contact with the center stop or abutment 76 within the sleeve 71.

The protrusive movement may be effected regardless of the positions of the guideways, except when said guideways are positioned at 90 degrees of the plus graduation, under which conditions no protrusion of the lower jaw can take place, as the only effect would be to move the pivot rods inwardly while the lower jaw member is moved downwardly away from the upper jaw member. The degree of protrusion, of course, is determined by the minus or plus inclination in the guideways, the greatest degree of protrusion being allowable when the guideways are set at zero, at which time they are in substantially horizontal position extending directly forward from the axis of the disk mount.

Lateral relation of the lower jaw 66 with reference to the upper jaw is effected by retaining the spherical terminal of one of the pivot rods 79 in its innermost position, or axially within its co-operating disk mount while moving the spherical terminal of the other pivot rod outwardly within its guideway, this being accomplished irrespective of the inclination of the guideways within said disk mounts. The inclination inwardly toward each other, or deviation of said guideways from the planes of rotation of the disk mounts in which they are formed, provide for a most effective relative adjustment of the jaws. It is, of course, understood that when the jaws are moved relatively laterally, a component protrusive movement takes place, which is a true reproduction of the lateral movement created by the human jaw.

It will be apparent therefore that when centric relation of the jaws exist, the spherical terminals of the pivot rods 79 will be axially disposed within the disk mounts 28; or this may be expressed by stating that said spherical terminals will be at the inner ends of their guideways. When true protrusive relation of the jaw members exist, the spherical terminals of said pivot rods will be at the outer ends of their guideways; and when lateral relation of the jaw exists, one of said spherical terminals will be positioned outwardly in its guideway to a greater degree than the other spherical terminal, or one of said spherical terminals will be at the inner end of its guideway while the other is positioned outwardly to the necessary degree.

In some cases where the normal centric or occlusive position of one of the jaws in a patient extends forwardly to a greater degree than the other, a similar centric or occlusive relation is provided in this device by the use of stop screws 86 threaded into the disk mounts 28 from the peripheral edge thereof in alinement with the guideways in said mounts, and when these stop screws are positioned to cause the inner ends thereof to project into the guideways of said disk mounts, the extreme inward positions of the centers of the spherical terminals of said pivot rods 79 will be forward of the axes of said disk mounts, all other adjustments or manipulations of the device being effected in the same manner as hereinbefore described.

While I preferably employ on each disk mount 28 a segment and associate therewith gear wheels for meshing engagement with said segments to adjust said mounts, in Fig. 10 I have illustrated a modified form for adjusting said mounts. In this figure a worm gear segment 87 is formed on each of the disk mounts 28, and meshing therewith is a worm 88 provided with an extension 89 at each end, one extension being reduced at its extremity to form a journal and the other having an axial socket 90 through which a pin 91 is passed, said socketed end serving as the other journal for said worm and the socket thereof being adapted to receive the adjusting key 58 in the same manner as provided for in the gear wheels 43. The spherical terminals of the pivot rods 79 are lubricated through lubricating devices 92 formed axially in the disk mounts.

As the lower jaw member 24 depends freely from the spaced parts of the fixed or upper jaw member 23, it tends to swing rearwardly on account of the overbalance created by the lower jaw 66 and the weight of the denture mounted thereon, as shown for instance by the numeral 94, Figs. 1 and 2, which denture is adapted for contact with the upper denture, designated by the numeral 95 in said figure, and with a view of checking the jar to which the parts would be subjected when the lower jaw member swings rearwardly against the standard 12, a spring 97 is longitudinally arranged between the lower ends of the depending arms 68, said spring being adapted to strike the standard when the jaw swings rearwardly and having its ends fastened to the arms 68 by means of securing screws 98, shown in Fig. 6.

With the operating parts of the device fully concealed and the requirement for a special key in order to operate the adjusting parts of the device, the adjustment of the same can be fully controlled by the instructors so that students, until they become experienced in the manipulation of the device, will not be able to disarrange or disassemble the parts.

Having thus described my invention, what I claim is:—

1. A dental instrument, comprising two relatively movable jaw members, one of said jaw members having rotatably adjustable supports provided with guideways disposed at an angle to the plane of rotation of said supports, and the other having pivot extensions guided for movement in said guideways.

2. A dental instrument, comprising two relatively movable jaw members, one having alined rotatably adjustable mounts spaced apart, and the other having slidable pivot elements journaled in said mounts.

3. A dental instrument, comprising two relatively movable jaw members, one of said jaw members having spaced pivot supports, mounts rotatably adjustable within said pivot supports and having guideways disposed to converge toward a plane medially between said mounts, and the other jaw member having pivot elements slidable toward and from each other and provided at their outer ends with enlargements confined within said guideways.

4. A dental instrument, comprising two relatively movable jaw members, one of said jaw members having spaced pivot supports provided with guideways converging toward a plane passing centrally between said pivot supports, and the other having oppositely extending pivots movable in said converging guideways.

5. A dental instrument, comprising two relatively movable jaw members, one of said jaw members having oppositely projecting pivots provided with terminal enlargements, and the other jaw member having guideways converging toward a plane centrally through said first jaw member and in which the terminal enlargements of said pivots are arranged for movement.

6. A dental instrument, comprising a fixed jaw member and a movable jaw member pivotally suspended between spaced parts of said fixed jaw member, said spaced parts having guideways disposed at an angle to a plane passing centrally through said movable jaw member at right angles to the pivot thereof and having the terminals of said pivot guided therein.

7. A dental instrument, comprising two relatively movable jaw members, one of said jaw members having spaced pivot supports provided with rotatably adjustable pivot mounts equipped with guideways at angular divergence from the planes of rotation of said mounts, the other jaw member having opposite pivot extensions provided with terminal enlargements fitting into said guideways, said pivot extensions being lengthwise movable independently.

8. A dental instrument, comprising two relatively movable jaw members having guideways formed therein and stops for said guideways adjustable to extend into the inner ends of said guideways any desired distance, the other jaw member having pivot extensions entered into said guideways and adapted for movement along said guideways, said pivot extensions being adapted for contact with said stops when projecting into said guideways.

9. A dental instrument, comprising two relatively movable jaw members, one of said jaw members having spaced pivot supports provided with rotatably adjustable mounts and concealed operating mechanism for adjusting said mounts, said mounts having guideways therein extending from their centers outwardly, and the other jaw member having opposite pivot extensions provided with terminal enlargements fitted into and adapted for movement along said guideways.

10. A dental instrument, comprising two relatively movable jaw members, one of said jaw members having spaced pivot supports provided with alined circular openings, disk mounts rotatably adjustable within said openings and having guideways therein extending from their centers outwardly, means for locking said pivot mounts against rotatable movement, and means for rotatably adjusting said pivot mounts when unlocked, the other jaw member having opposite pivot extensions projecting into said disk mounts and being provided with terminal enlargements fitting said guideways.

11. A dental instrument, comprising two relatively movable jaw members, one of said jaw members having spaced pivot supports provided with circular openings, rotatably adjustable disk mounts within said circular openings, each disk mount having a peripheral groove and a peripheral flange provided with gear teeth, gear wheels meshing with the gear teeth of said peripheral flanges, and lock screws extending into said peripheral grooves, the other jaw member having pivot extensions entering said disk mounts and being slidably disposed for movement toward and from the axes thereof.

12. A dental instrument, comprising a fixed jaw member having spaced parts provided with alined circular openings, disk mounts rotatably adjustable within said alined openings, each disk mount having a guideway therein trending at an angle to the plane of rotation thereof and being provided with a peripheral groove and a peripheral flange equipped with gear teeth, cover plates applied to the outer sides of said spaced parts and retaining the rotatably adjustable disk mounts therein, said cover plates having key holes therein, gear elements within each of said spaced parts in mesh with the gear teeth of said peripheral flanges and concealed by said cover plates, said gear elements being rotatably operated through said key holes, and lock screws in said spaced parts and adapted to enter the peripheral grooves in said disk mounts to lock the latter against rotatable adjustment, the other jaw member having opposite pivot extensions provided with enlarged terminals fitted into said guideways.

13. A dental instrument, comprising two relatively movable jaw members, one of said jaw members having spaced parts provided with guideways of substantially circular formation in cross section, and the other being disposed between said fixed parts and having opposite pivot extensions provided with spherical enlargements slidably arranged within said guideways.

14. A dental instrument, comprising two relatively movable jaw members, one of said jaw members having spaced parts provided with pivot guideways and with centering elements extending inwardly from said spaced parts, the other jaw member having a cross member at its upper end and pivot extensions projecting into said guideways for movement therein, opposite ends of said cross member being adapted for contact with said centering elements to determine normal centric relation of said jaw members.

15. A dental instrument, comprising a fixed jaw member and a movable jaw member, said fixed jaw member having spaced parts provided with guideways, and said movable jaw member having a cross member disposed between said spaced parts and provided with a longitudinal bore, an abutment within said bore, and pivot members longitudinally slidable within said bore and limited in their inward movements by said abutment, said pivot members projecting from opposite ends of said cross member and having their terminals pivotally and slidably arranged within said guideways.

16. A dental instrument, comprising a fixed jaw member having spaced parts provided with guideways diverging toward a plane centrally between said spaced parts, and a movable jaw member provided with a cross member disposed between said spaced parts and having a bore extending inwardly from each end thereof, and pivot members longitudinally slidable within said bore and having terminal enlargements fitting into said guideways, said pivot members being limited in their inward movement within said bores by the inner ends of the latter.

17. A dental instrument, comprising a fixed jaw member having an oblong body portion, a parti-circular jaw extending forwardly from said body portion and pivot supports depending from opposite ends of said body portion, a pivoted jaw member comprising a cross member disposed between said pivot supports and provided with opposite pivot elements rotatably and slidably mounted in said pivot supports, arms depending from opposite ends of said cross member, and a jaw connecting the lower ends of said arms and extending forwardly therefrom.

18. A dental instrument, comprising a fixed jaw member having a forwardly extending jaw, and spaced pivot supports, a movable jaw member comprising a cross member disposed between said pivot supports, arms depending from opposite ends of said cross member, a jaw connecting said arms and extending forwardly therefrom, a sleeve mounted in said cross member, and pivot elements slidably entered into said sleeve from opposite ends and having their outer terminals pivotally and slidably supported within said spaced pivot supports.

19. A dental instrument, comprising two relatively movable jaw members, one of said members having spaced parts provided with guideways and having also centering stops extending inwardly from their inner faces, said centering stops having conical outer ends, the other jaw member having a cross member disposed between said spaced parts and provided with beveled terminals adapted for co-action with the conical ends of said centering stops, and pivot elements projecting from opposite ends of said cross member and rotatably and slidably positioned within said guideways.

20. A dental instrument, comprising a fixed jaw member having spaced parts provided with circular openings and substantially circular depressions, disk mounts within said circular openings having guideways and a peripheral flange equipped with gear teeth, cover plates applied to the outer sides of said spaced parts concealing the peripheral flanges of said disk mounts and having a key hole therein, gear wheels mounted in said circular depressions in mesh with the teeth of said peripheral flanges and having an opening therethrough and a pin extending diametrically through said opening, the openings of said gear wheels being alined with the key holes in said cover plates to permit the insertion of a slotted key therethrough for rotating said gear wheels through the medium of said diametral pin, and a movable jaw member having opposite pivot elements entered into said guideways.

21. A dental instrument comprising a fixed jaw member, and a movable jaw member co-operatively supported with respect to said fixed jaw member, said movable jaw member having longitudinally movable supported pivot elements projecting laterally therefrom for pivotally and slidably supporting said movable jaw member.

In testimony whereof I affix my signature.

RUDOLPH L. HANAU.